(12) United States Patent
Cilluffo et al.

(10) Patent No.: US 7,201,443 B2
(45) Date of Patent: Apr. 10, 2007

(54) METHOD AND APPARATUS FOR MOUNTING REAR SEAT ENTERTAINMENT DEVICE

(75) Inventors: Joseph Cilluffo, Greenville, SC (US); Alden Bartle, Greenville, SC (US)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 10/971,936

(22) Filed: Oct. 22, 2004

(65) Prior Publication Data

US 2006/0087163 A1 Apr. 27, 2006

(51) Int. Cl.
*A47C 7/62* (2006.01)
(52) U.S. Cl. .................... 297/188.06; 297/188.04; 297/217.3; 297/463.1; 248/917
(58) Field of Classification Search ........... 297/188.04, 297/188.01, 188.06, 188.2, 463.1, 463.2, 297/165, 163, 217.3; 248/917; 224/275
See application file for complete search history.

(56) References Cited

U.S. PATENT DOCUMENTS

| | | | | |
|---|---|---|---|---|
| 4,681,366 A | * | 7/1987 | Lobanoff | ............... 297/188.06 |
| 4,757,928 A | * | 7/1988 | Browne | ....................... 224/275 |
| 4,792,183 A | * | 12/1988 | Townsend, III | ............. 297/163 |
| 5,791,614 A | * | 8/1998 | Sims | ....................... 248/230.7 |
| 5,984,347 A | * | 11/1999 | Blanc-Rosset | ............... 280/727 |
| 6,215,518 B1 | | 4/2001 | Watkins | |
| 6,231,017 B1 | * | 5/2001 | Watkins | .................... 248/274.1 |
| 6,601,914 B1 | * | 8/2003 | Seastrom | ............... 297/188.06 |
| 6,607,241 B2 | * | 8/2003 | Johnston | ............... 297/188.06 |
| 6,669,285 B1 | | 12/2003 | Park et al. | |
| 6,739,654 B1 | | 5/2004 | Shen et al. | |
| 7,111,814 B1 | * | 9/2006 | Newman | .................. 248/274.1 |
| 2006/0082212 A1 | * | 4/2006 | Chou et al. | ............... 297/463.1 |

FOREIGN PATENT DOCUMENTS

| | | | |
|---|---|---|---|
| DE | 19943696 A1 | * | 3/2001 |
| FR | 2639198 A2 | * | 5/1990 |
| JP | 2002-36968 | | 2/2002 |
| JP | 2004-42689 | | 2/2004 |
| JP | 2004-149071 | | 5/2004 |

* cited by examiner

*Primary Examiner*—Joseph Edell
(74) *Attorney, Agent, or Firm*—Muramatsu & Associates (57) ABSTRACT

A method and apparatus for mounting a rear seat entertainment device easily and quickly on a seat of a vehicle without affecting the height adjustment of a headrest. The method includes the steps of preparing a bracket having an attachment portion for attachment with the seat and a mounting wall for attachment with a rear seat entertainment device, shifting a headrest upwardly to expose a headrest support tube and a flange of the support tube, placing the attachment portion of the bracket between the flange and a top surface of the seat in such a way that an opening of the attachment portion surrounds the support tube, attaching the rear seat entertainment device to the mounting wall of the bracket, and fixedly attaching a lower part of the rear seat entertainment device to the back of the seat.

18 Claims, 11 Drawing Sheets

METHOD AND APPARATUS FOR MOUNTING REAR SEAT ENTERTAINMENT DEVICE

FIELD OF THE INVENTION

This invention relates to a method and apparatus for mounting a rear seat entertainment device on a back of a seat. More particularly, this invention relates to a method and apparatus for mounting a rear seat entertainment device on a front seat or a middle seat of a vehicle with use of a support tube of a headrest to securely attach the entertainment device without affecting the adjustability of the headrest.

BACKGROUND OF THE INVENTION

As the technologies for display devices, speakers, and DVD systems advance, the demand for mounting these audio and video devices on a vehicle becomes higher and higher for enjoyment of music, moves, etc., in the vehicle. Normally, such an audio and video device (rear seat entertainment device) comprises a display unit or monitor, a speaker, and a playback device such as a videocassette player or a DVD player. Typically, such an audio and video device is mounted on a back of a front seat or middle seat of the vehicle because the use of the display unit by passengers in the rear or middle seat will not adversely affect the safe driving of the vehicle.

Figure 1:
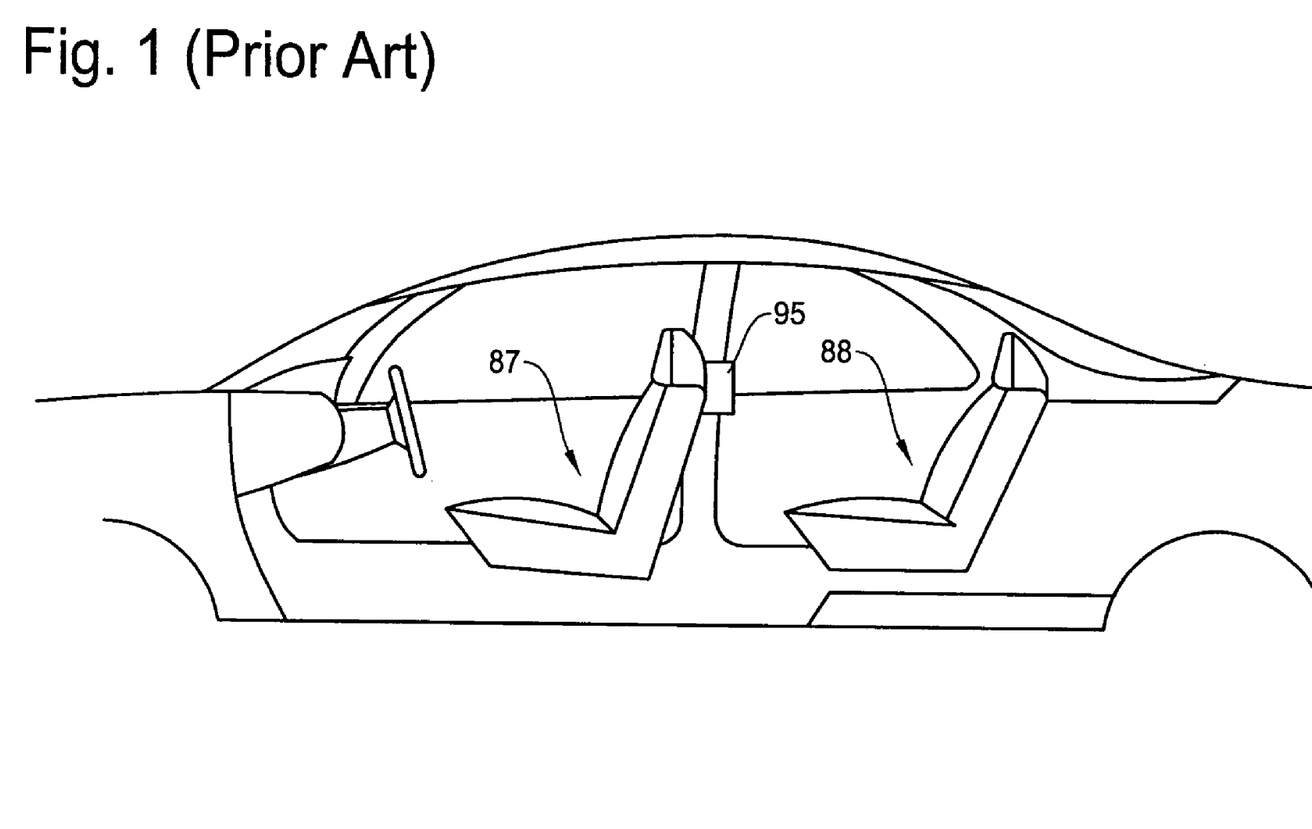
FIG. 1 is a cross sectional side view showing an inner structure of a common vehicle and the positional relationship between the front seat and the rear seat and a rear seat entertainment device.

FIG. 1 is a cross sectional side view showing an example of inner structure of a vehicle. A user or a dealer has to install a rear seat entertainment device at an appropriate position of the vehicle. Typically, a rear seat entertainment device 95 is attached to the back of a front seat (either driver seat or passenger seat) 87 to allow easy viewing and operation by a passenger in a rear seat 88 while avoiding interruption to the driver. The present invention aims to provide a method and apparatus for mounting a rear seat entertainment device so that passengers at the rear seat 88 can watch movies, TV programs, play games, and the like.

Figure 2:
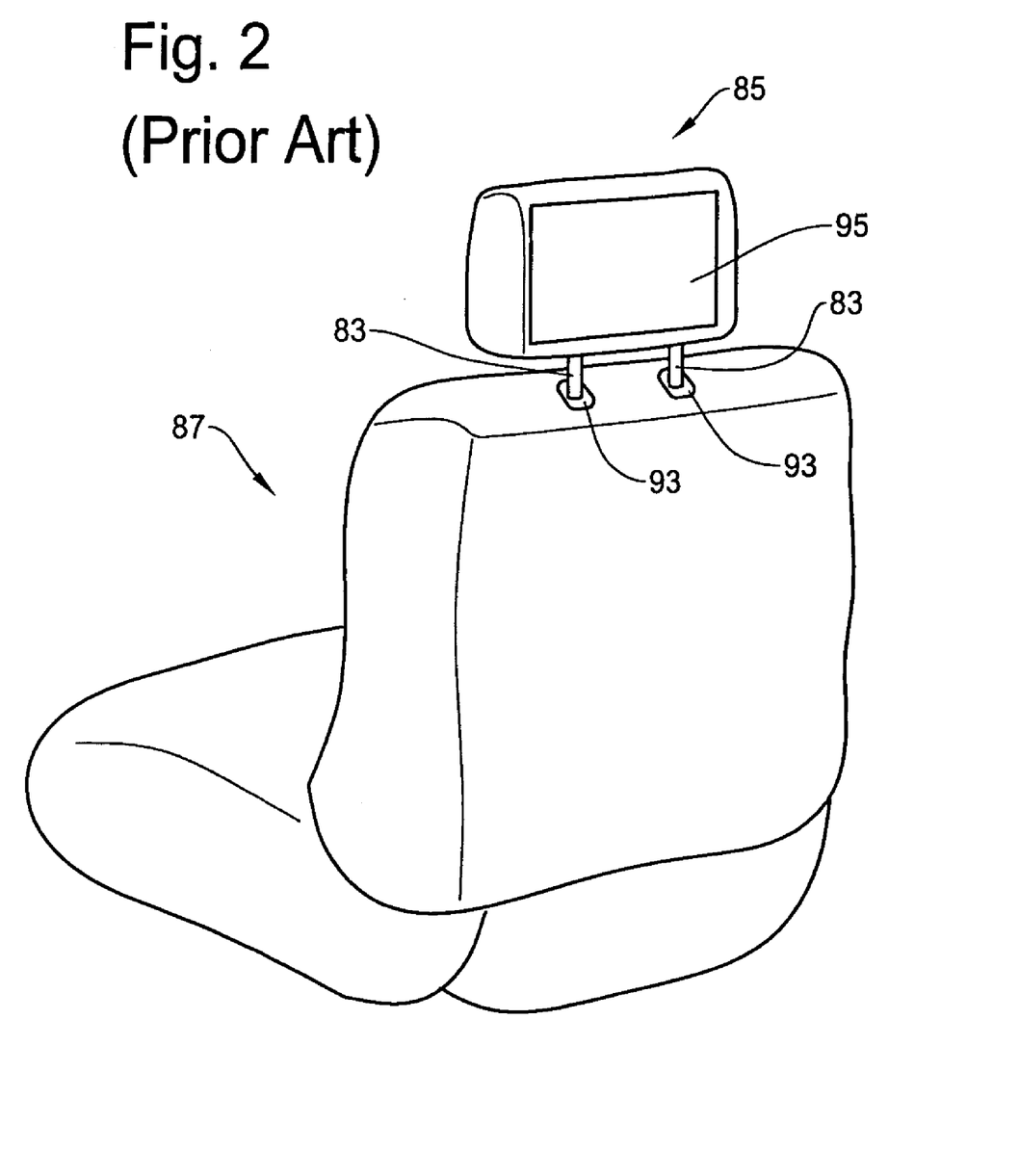
FIG. 2 is a schematic view showing a rear seat entertainment device mounted on a back of a front seat headrest in the conventional technology.

One such example of installing the rear seat entertainment device for a back seat or a middle seat passenger is shown in FIG. 2. In this example, the rear seat entertainment device (display unit or entire housing) 95 is mounted on a headrest 85 of the front seat 87. As is known in the art, the headrest 85 is adjustably mounted on the seat 87 through support rods 83 and support tube flanges 93. The entertainment device 95 is placed in such a way that it snugly fits into the placement hole created at the back of the headrest 85 of the front seat 87.

Although this configuration allows the rear seat and middle seat passenger to watch the display screen, several drawbacks are recognized. First, mounting the entertainment device is difficult or complicated because the back of the head rest 85 must be gauged out. It requires massive changes of the headrest 85 that necessitate specialized tools and components to complete the job. Therefore, rather than the user mounts the entertainment device by himself, it may be necessary that the dealer provides a separate headrest that already mounts the entertainment device.

However, the colors and textures of the headrest often do not match to those in the intended car seat. Providing suitable headrests with a display to vehicles in the market is costly due to the variety of vehicles and their colors. Further, the position of the entertainment device changes as the front seat passenger or driver adjusts the height of the headrest 85. This can lead to an inappropriate viewing angle, which may discomfort the rear or middle seat passenger. More seriously, the headrest may not function properly when an accident occurs because the inner original materials thereof have to be removed.

Likewise, a mounting method and apparatus was proposed wherein an entertainment device is inserted in the gauged-out placement hole at the back of the front seat rather than the headrest. Although this placement can avoid the interference arising from the adjustment of the headrest, the position of the display tends to be too low and therefore an optimum viewing angle is difficult to attain. Moreover, mounting the entertainment device is difficult or involves a substantial amount of work because the back of the front seat must be gauged out. It requires massive works by using special tools to make the placement hole and installing the entertainment device therein, resulting in high cost. Further, if a second buyer of the vehicle does not like the location of the entertainment device, the whole seat may have to be replaced.

Thus, there is a need for a method and apparatus of mounting a rear seat entertainment device that is capable of easily and quickly mounting the entertainment device without affecting the height adjustment of the headrest.

SUMMARY OF THE INVENTION

It is, therefore, an object of the present invention to provide a method and apparatus for mounting a rear seat entertainment display securely without affecting the height adjustment of the headrest.

It is another object of the present invention to provide a method and apparatus for mounting a rear seat entertainment device on a front seat or a middle seat of a vehicle quickly and easily without increasing the cost.

It is a further object of the present invention to provide a method and apparatus for mounting a rear seat entertainment device on a front seat or a middle seat of a vehicle without adversely affecting the safety of the vehicle.

It is a further object of the present invention to provide various variations and alternatives of method and apparatus for mounting a rear seat entertainment device on a front seat or a middle seat of a vehicle.

One aspect of the present invention is a method for mounting a rear seat entertainment device on a front seat or a middle seat of a vehicle. The mounting method includes the steps of: preparing a bracket having an attachment portion for attachment with the seat and a mounting wall for attachment with a rear seat entertainment device; shifting a headrest upwardly or removing the headrest from the seat to expose a headrest support tube and a flange of the support tube; and placing the attachment portion of the bracket between the flange and a top surface of the seat in such a way that an opening of the attachment portion surrounds the support tube. The support tube is formed in the seat where a top portion of the support tube and the flange are positioned on the top surface of the seat.

The method further includes a step of attaching the rear seat entertainment device to the mounting wall of the bracket before conducting the step of placing the attachment portion of the bracket to top surface of the seat. Alternatively, the method includes a step of attaching the rear seat entertainment device to the mounting wall of the bracket after conducting the step of placing the attachment portion of the bracket to top surface of the seat.

Preferably, the method further includes a step of attaching the rear seat entertainment device to the back of the seat. In the step of attaching the rear seat entertainment device to the back of the seat, it is preferable that the step includes a process for connecting the rear seat entertainment device and an inside frame of the seat through an attachment member.

In one embodiment, the attachment portion has a J-shaped hook that forms the opening that surrounds the support tube when the attachment portion is attached to the seat between the flange and the top surface of the seat. In another embodiment, the attachment portion has a clip member that opens and closes, where the clip member forms the opening that surrounds the support tube when the attachment portion is attached to the seat between the flange and the top surface of the seat. In a further embodiment, the attachment portion has an attachment hole that forms the opening that surrounds the support tube when the attachment portion is attached to the seat between the flange and the top surface of the seat.

In a further embodiment, the attachment portion is configured by a hinge which is a member separate from the bracket, where the hinge has a U-shape in plan view and a step like shape in side view and is inserted in a slit of the bracket, and where the U-shape of the hinge forms the opening that surrounds the support tube when the attachment portion is attached to the seat between the flange and the top surface of the seat.

In a further embodiment, the attachment portion is configured by a hinge which is a member separate from the bracket, where the hinge has a U-shape has an attachment hole and is attached to the bracket through a fastening means, and where the U-shape of the hinge forms the opening that surrounds the support tube when the attachment portion is attached to the seat between the flange and the top surface of the seat.

Another aspect of the present invention is an apparatus for mounting a rear seat entertainment device on a seat of a vehicle for implementing the various steps defined in the mounting method of the present invention noted above. The mounting apparatus allows a user to attach the rear seat entertainment device easily and quickly to a front seat or a middle seat of a vehicle without affecting the height adjustment of a headrest.

According to the present invention, the rear seat entertainment device can be mounted on the front seat or middle seat of the vehicle quickly and easily without increasing the cost or adversely affecting the safety of the vehicle. The method and apparatus of the present invention for mounting the rear seat entertainment device eliminates the need of gauging out the back of the seat or the headrest. Moreover, the position of the entertainment device will not be changed when the front seat passenger adjusts the height of the headrest. The method and apparatus of mounting the entertainment device in the present invention allows optimum viewing angle even when the user changes the height of the head rest.

BRIEF DESCRIPTION OF THE DRAWINGS

FIGS. 8A and 8B are top views of a seat when the headrest is removed where FIG. 8A shows the flanges and support tubes of the headrest before mounting the bracket of the present invention, and FIG. 8B shows the bracket of the present invention inserted between the flanges and the top surface of the seat for mounting the rear seat entertainment device.

FIG. 9A is a side view of the seat mounting the entertainment device and FIG. 9B is a perspective view of the seat mounting the entertainment device.

FIG. 10A is a top view of the bracket and FIG. 10B is a side view of the bracket.

FIG. 11A is a top view of the bracket and FIG. 11B is a side view of the bracket.

FIGS. 12A and 12B are schematic diagrams showing an example of bracket for mounting the rear seat entertainment device in the fourth embodiment of the present invention where FIG. 12A is a top view of the bracket and FIG. 12B is a side view of the bracket showing the process of attaching hinges.

FIG. 13A is a top view of the bracket and FIG. 13B is a side view of the bracket.

DETAILED DESCRIPTION OF THE INVENTION

The present invention will be described in detail with reference to the accompanying drawings. The method and apparatus for mounting a rear seat entertainment device in the present invention utilizes a bracket that is mounted on the top surface of the seat with use of headrest support tubes that are provided to a front seat of a vehicle. The present invention can also be applied to a middle seat when a vehicle has three or more rows of seats, although the following descriptions will be made for the case of the front seat. Before describing the details of the present method and apparatus for mounting a rear seat entertainment device, a front passenger seat or a driver seat to which the present mounting system is applied is briefly described.

Figure 3:
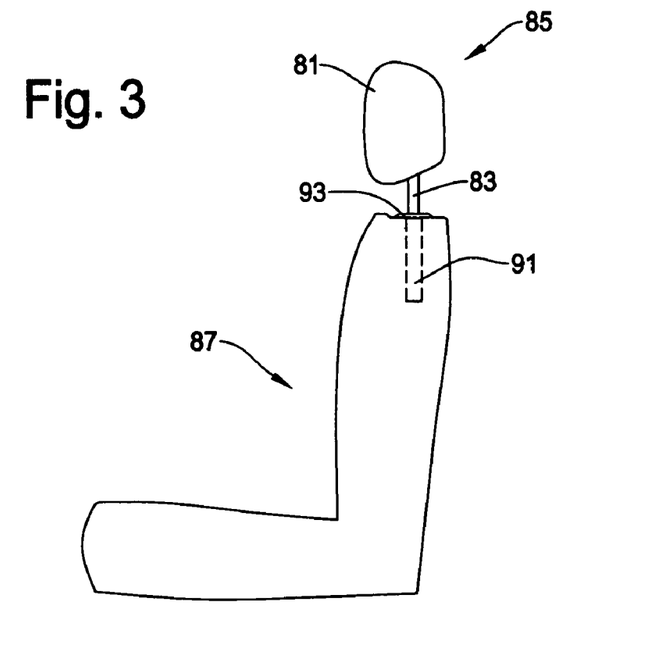
FIG. 3 is a schematic side view showing an example of structure of a front seat related to a headrest that is adjustable in height.

Typical sedan type vehicle has both front seats and rear seats. The present invention provides a method and apparatus for easily and quickly mounting a rear seat entertainment (RSE) device that enables rear seat passengers to watch, for example, TV programs, DVD movies or play games. FIG. 3 is a simplified side view showing a typical front seat (passenger or driver seat) 87. The front seat 87 has a headrest 85 on its top so that a passenger or a driver can lean his head thereon.

The headrest 85 comprises a head cushion 81 and support rods 83. The head cushion 81 provides an area for the passenger or driver sitting on the seat rest his head. In order to accommodate physical characteristics of each individual, the height of the head cushion 81 is generally adjustable. This is achieved by the adjustable support rods 83 and headrest support tubes 91 which are indicated by dotted lines. As shown in FIG. 3, the headrest support tubes 91 are formed vertically inside the back of the seat 87 to receive the support rods 83 where support tube flanges 93 are positioned at the top ends of the headrest support tubes 91.

Figure 4:
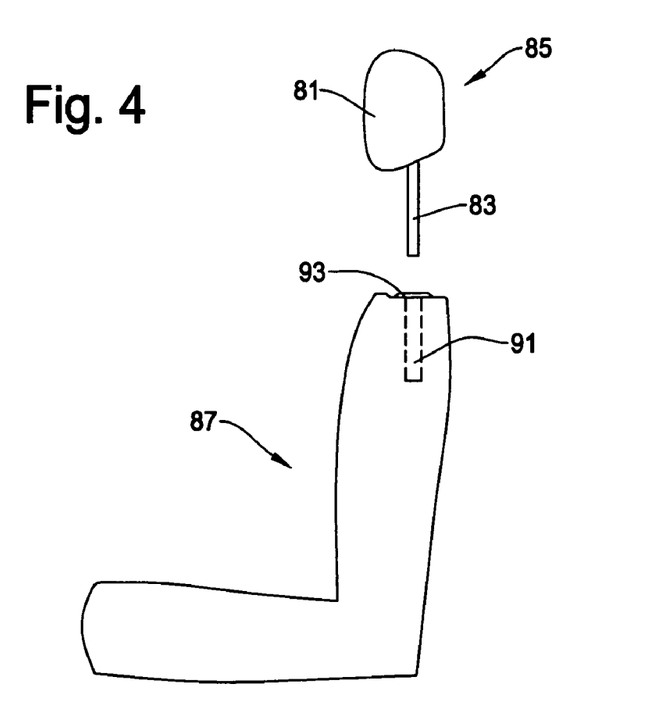
FIG. 4 is a schematic side view showing an example of structure of a front seat related to a headrest in which the headrest is detached from the seat.

In general, two headrest support tubes 91 are provided to the front seat 87 to securely hold the headrest rods 83 and the head cushion 81. The position of the head cushion 81 changes as the support rods 83 move up and down in the support tubes 91 to match the height of the user. Generally, the headrest 85 can be detached from the seat body. FIG. 4 shows the front seat 87 where the headrest 85 is detached from the seat body by pulling the headrest 85 upward. The mounting method of the present invention is preferably conducted after removing the headrest 85 from the front seat 87 as described below. It should be noted that in case where a sufficient space can be attained for a work of mounting a RSE device 95 by simply moving the headrest 85 upwardly, it is unnecessary to completely remove the headrest 85 from the seat 87.

Figure 5:
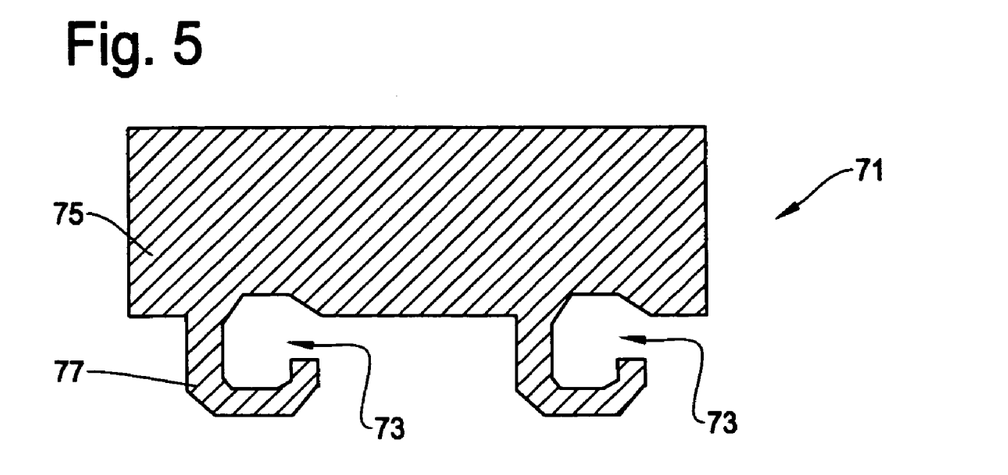
FIG. 5 is a top view showing an example of a bracket for mounting a rear seat entertainment device on the front seat or middle seat with use of flanges of the support tubes of the headrest in accordance with the first embodiment of the present invention.
Figure 6:
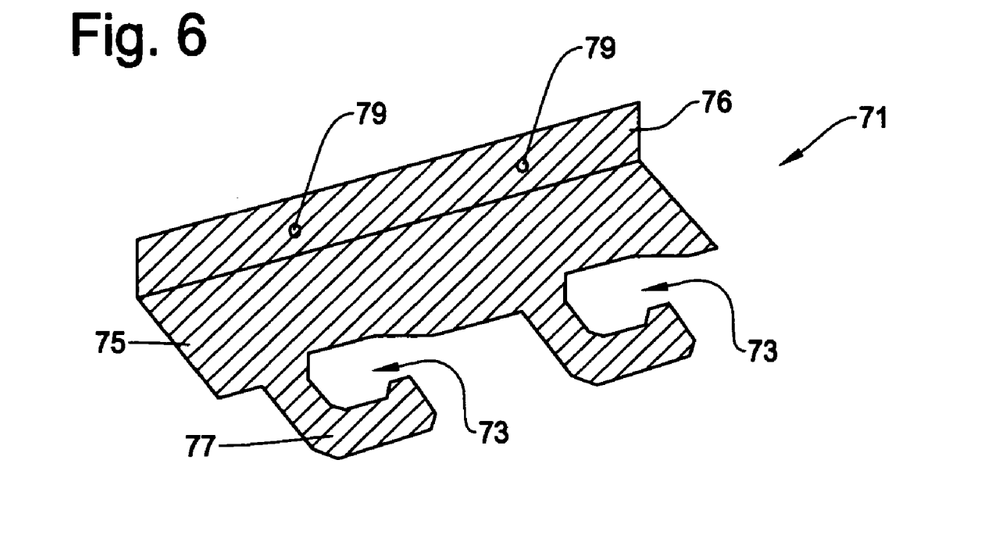
FIG. 6 is a perspective view of the bracket of FIG. 5 for mounting the rear seat entertainment device on the front or middle seat.

FIG. 5 shows a bracket 71 incorporated in the first embodiment of the present invention for mounting a RSE device 95 on the front seat 87. The bracket 71 comprises a hook (attachment) portion 77, a plate portion 75 and a mounting wall 76 (FIG. 6). The hook portion 77 fits with the support tube flanges 93 on the top of the seat front 87, thereby mounting a RSE device on the top of the front seat 87. In this embodiment, the attachment portion 77 has a hook-like shape that encircle the support tubes 91 as will be explained later in more detail. The attachment portion 77 has a J-shape to form a round area (opening) 73 to allow easy installation of the bracket 71 due to its opening at one side as will be explained later in detail.

FIG. 6 is a perspective view showing the bracket 71 of FIG. 5 in the present invention. The bracket 71 has a mounting wall 76 which is in a predetermined angle, for example, perpendicular to the plate portion 75. This mounting wall 76 has fixing means such as screw holes 79 for attaching the RSE device 95 as will be explained later. When mounting the bracket 71 on the front seat 87, the hook portion 77 will face the front of the automobile, while the mounting wall 76 will face the back of the automobile, thereby setting up desired display angle.

Referring now to FIGS. 7A–7D, the procedure of mounting the bracket 71 on the seat will be explained. Perspective views of FIGS. 7A–7D show the front seat 87 and bracket 71 as viewed from the front side of the vehicle. In the process of FIGS. 7A–7D, only the bracket 71 is shown for simplicity. However, it is also possible that the bracket 71 has a RSE device 95 pre-installed before being attached to the front seat 87. The large arrows indicate the direction of force exerted on the bracket 71 by a person (user) installing the bracket 71.

Figure 7A:
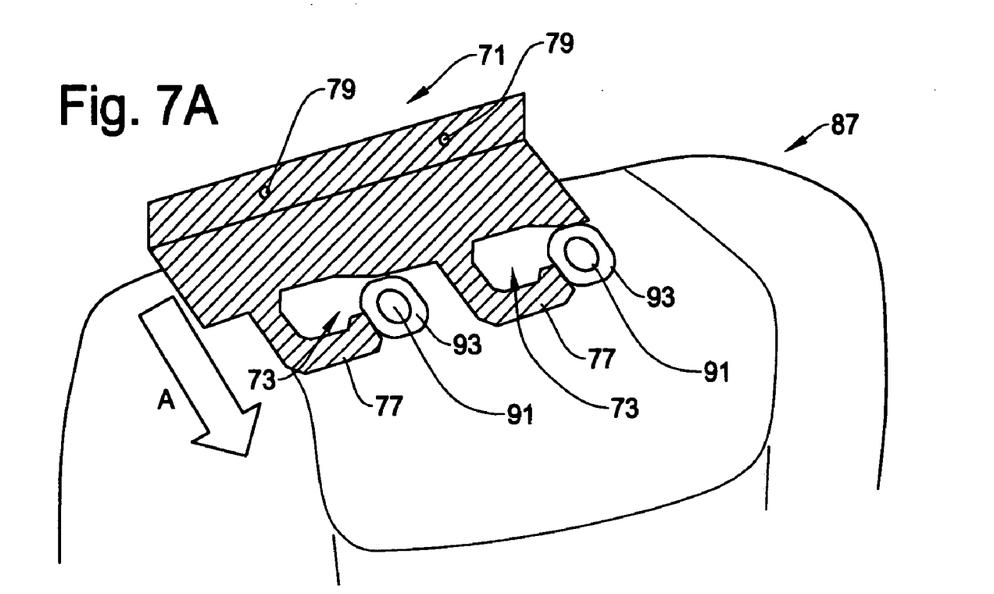
FIGS. 7A–7D are perspective views showing the process of mounting the bracket of FIGS. 5 and 6 on the top of the seat by inserting the bracket between the flanges of the support tubes and the top surface of the seat in the first embodiment of the present invention.

FIG. 7A shows a perspective view of the front seat 87 where the headrest 85 is already detached from the seat in a manner shown in FIG. 3B. Thus, the top of the front seat 87 shows a pair of headrest support tubes 91 and the support tube flanges 93. In FIG. 7A, the user will apply a force in the forward direction (arrow A) of the front seat while pressing down the bracket 71 on the top of the front seat 87. Since the front seat 87 is elastic because of cushion materials therein, the user can easily press down the top surface of the front seat 87.

Figure 7B:
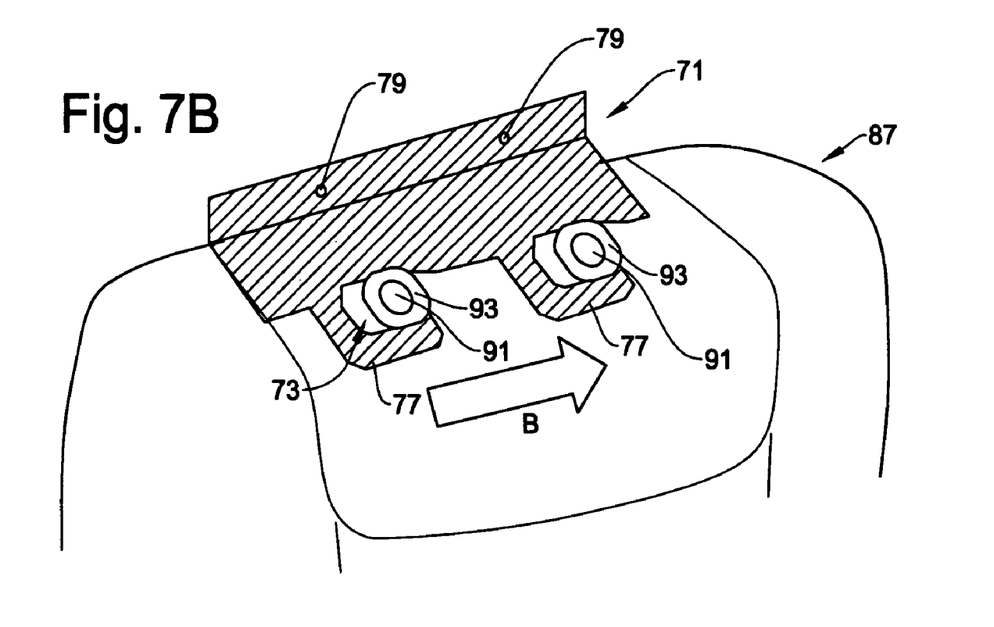

In the step shown in FIG. 7B, the user will slide the bracket 71 to the direction of the arrow B until the opening 73 formed by the hook portion 77 makes a full contact with headrest support tubes 91. It should be noted that a part of the bracket 71 can be underneath the support tube flanges 93. In other words, the bracket 71 is sandwiched between the support tube flanges 93 and top surface of the front seat 87.

Figure 7C:
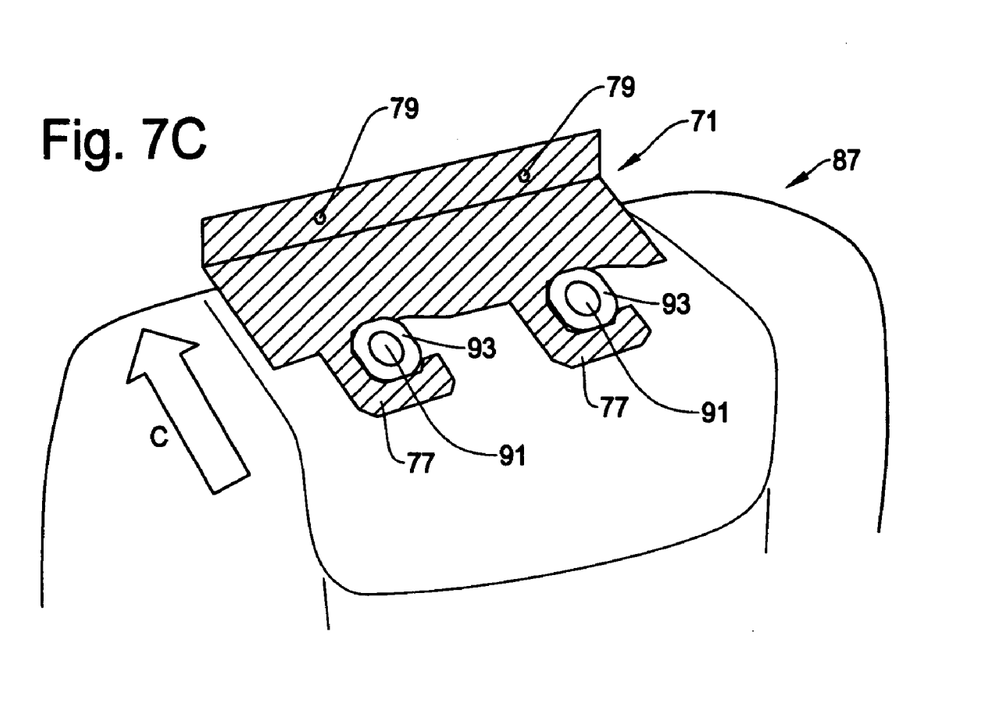
Figure 7D:
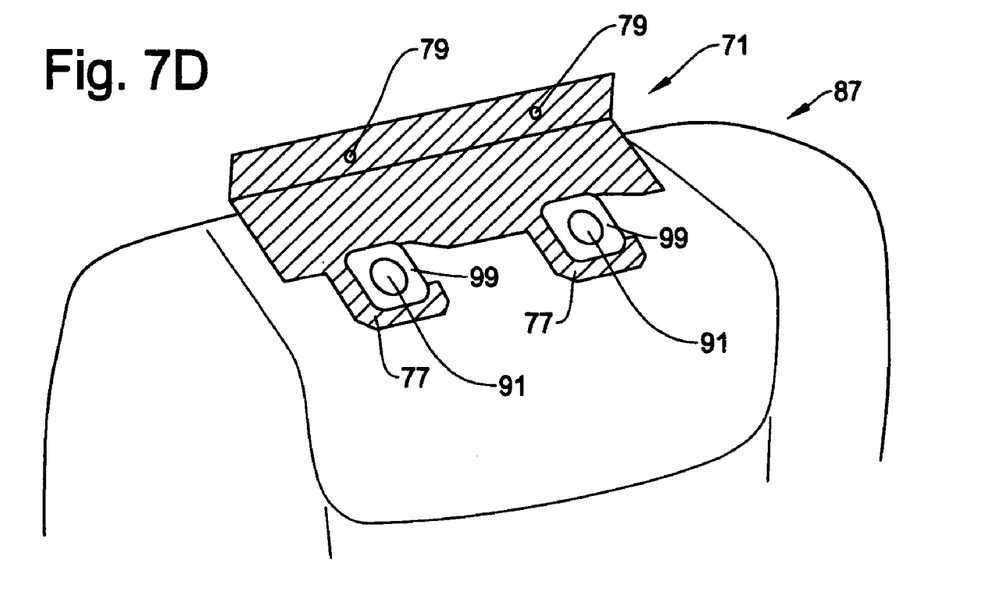

In FIG. 7C, the user firmly pulls the bracket 71 to the backward direction (arrow C) so that at least a part of the hook portion 77 comes under the support tube flanges 93 as noted above. FIG. 7D shows the seat in accordance with the present invention when the mounting procedure is completed. The bracket 71 is securely attached on the front seat 87 between the top surface of the seat and the support tube flanges 93. In this example, caps 99 are attached again over the support tube flanges 93 for an aesthetic purpose.

Since the attachment portion 77 of the bracket 71 is clamped between the support tube flanges 93 and the top surface of the seat which has a sufficient spring force, the bracket 71 snugly fits on the front seat 87. It should be noted that the bracket 71 is not attached to any part of the headrest 85 or the support rod 83. Thus, the support tube flanges 93, the support tubes 91, and the seat top cushion are stable enough regardless of the movement of the headrest 85. Accordingly, the position of the RSE 95 device mounted by the present invention is not affected by the height adjustment of the headrest 85.

Figure 8A:
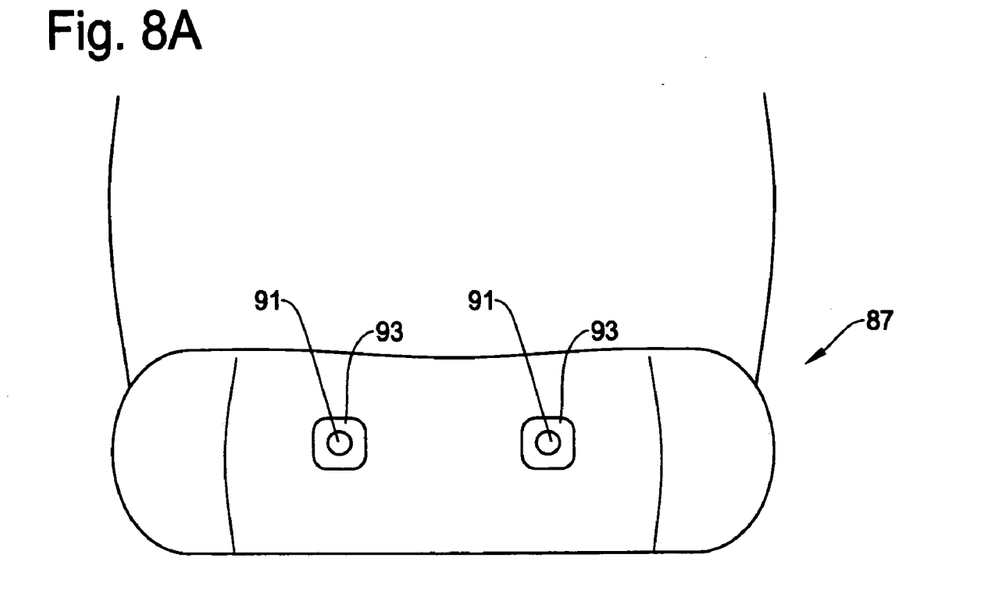

FIG. 8A shows the top view of the front seat 87 when the headrest 85 is temporally removed therefrom before mounting the bracket 71, thereby exposing the top portions of the support tubes 91 and the support tube flanges 93. The top portions of the support tubes 91 and the support tube flanges 93 are positioned on the top surface of the front seat 87 while most of the support tubes 91 are embedded in the back of the front seat 87. As noted above, in the case where a sufficient space can be attained for a work of mounting the RSE device 95 by shifting the position of the headrest 85 upwardly, it is unnecessary to completely detach the headrest 85 from the front seat 87.

The support tubes 91 are formed vertically at the inside of the back of the front seat 87 (FIGS. 3 and 4). The support tubes 91 function to hold and guide the support rods 83 of the headrest 85. The support rods 83 move up and down inside the support tubes 91 when adjusting the height of the headrest 85. The support tube flanges 93 are provided at the top of the support tubes 91 on the top surface of the front seat 87. Generally, the support tube flanges 93 are securely fixed to or integrally formed with the top of the support tubes 91. In many vehicles, caps (FIG. 7D) 99 that cover the flanges 93 may also be provided for front seats for an aesthetic purpose. In the example of FIG. 8A, caps are detached and not shown.

Figure 8B:
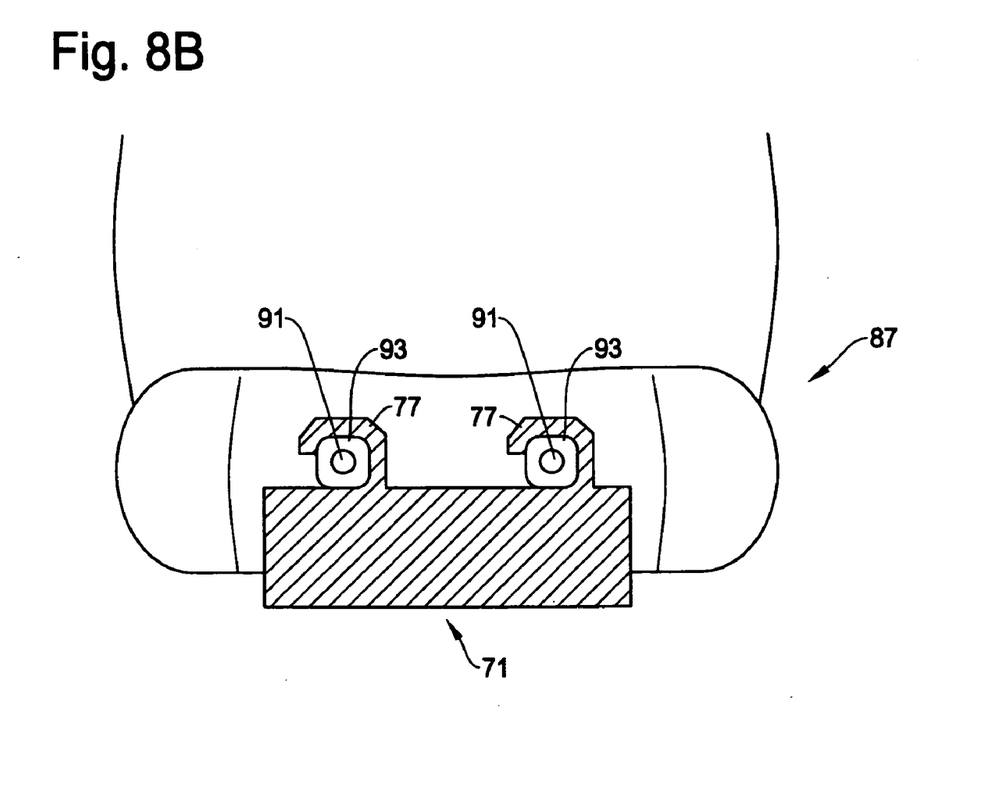

FIG. 8B shows the top view of the front seat 87 when the bracket 71 is mounted thereon after the headrest 85 is temporally removed therefrom. The openings 73 (not shown) formed by the attachment portions 77 snugly fit with the space between the support tube flanges 93 and the top surface of the front seat 87. In other words, the bracket 71 is sandwiched between the top surface of the seat and the support tube flanges 93. Due to the elasticity (cushion) of the top surface of the set, the bracket 71 is pressed upwardly while the support tube flanges 93 maintain their vertical position. Thus, the bracket 71 is securely fixed to the seat 87.

The mounting method and apparatus of the present invention provides a sufficient strength for maintaining the RSE device 95 on the front seat 87. Even when a large pressure or shock is applied to the RSE device 95 or the front seat 87, the RSE device 95 will not fall-off from the front seat 87. This is because the RSE device 95 has to move in two directions which are opposite to the arrows A and B in FIGS. 7A and 7B, to be removed from the front seat 87. Namely, in the case of FIG. 8B, to be removed, the RSE device 95 must be moved forward and then to the right. Because of the two directions of force are required for removal, it is unlikely that the RSE device 95 is accidentally fell-off. Thus, the mounting method and apparatus of the present invention will not adversely affect the safety of the vehicle.

After installing the bracket, a RSE device 95 may be mounted on the mounting wall 76 of the bracket 71. Alternatively, the bracket 71 may have a pre-installed RSE device 95 before it is attached to the seat 87 so that the user need not install the RSE device later. The RSE device may be further affixed to the seat at the bottom of the seat for improved durability and aesthetics as shown in FIGS. 9A and 9B.

Figure 9A:
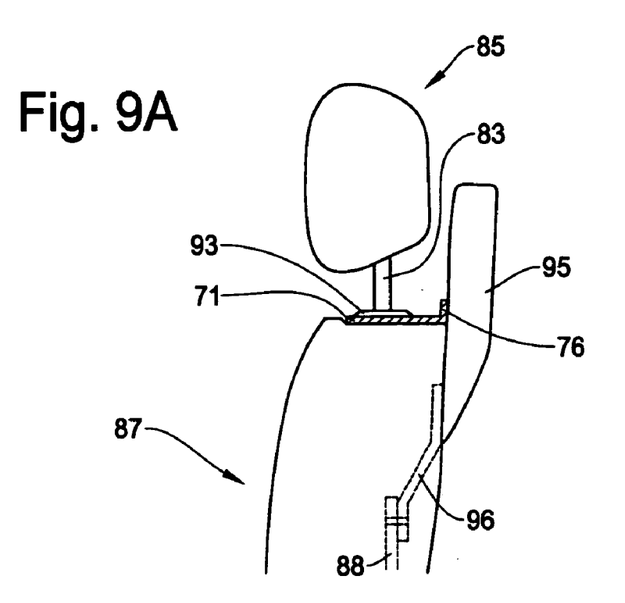
FIGS. 9A and 9B are schematic diagrams showing an example of structure when the rear seat entertainment device is mounted on the seat in the present invention in which the lower part of entertainment device is further attached to the back of the seat, where
Figure 9B:
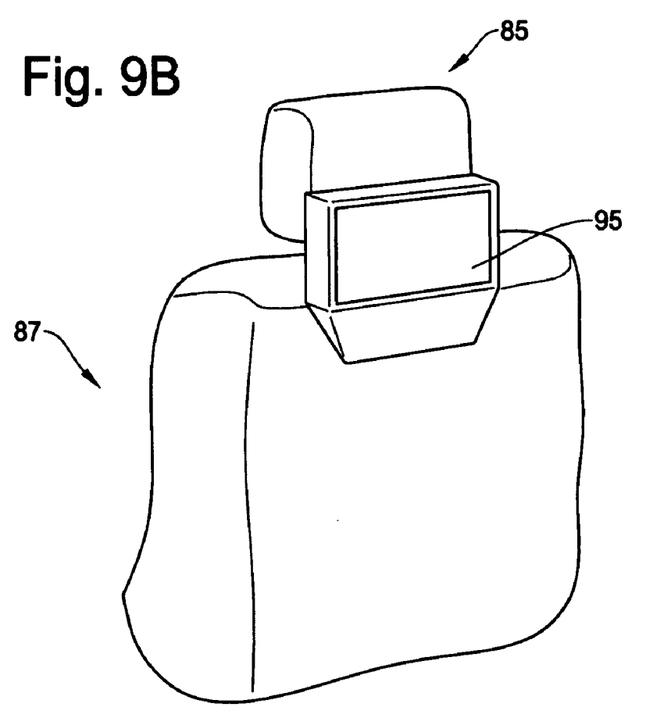

FIGS. 9A and 9B show the overall view of the bracket having a rear seat entertainment (RSE) device 95 in the present invention. FIG. 9A is a side view showing the headrest 85, support rod 83, the bracket 71, and the RSE device 95. The RSE device 95 is connected to the mounting wall 76 of the bracket 71. The bracket 71 is sandwiched between the top surface of the front seat 87 and the support tube flanges 93. In this example, to reinforce the attachment strength to the front seat 87, the lower part of the RSE device 95 is connected to an inside frame 88 of the front seat 87 through an attachment member 96. An example of such an attachment member 96 is a metal plate to connect the RSE device 95 and the inside frame 88.

FIG. 9B is a perspective view showing the RSE device 95 mounted on the front seat 87 according to the method of the present invention. As shown, the RSE device 95 provides optimum viewing angle for passengers in the rear seat. Since the mounting method of the present invention does not affect the mechanism of the headrest 85, the height of the headrest 85 can be changed freely while maintaining the RSE device 95 at the same position.

Although the above embodiment uses the bracket 71 having the j-shaped attachment portions 77, other configuration of the bracket can also be used in the present invention. FIGS. 10A to 13B show other examples of the bracket to implement the present invention.

Figure 10A:
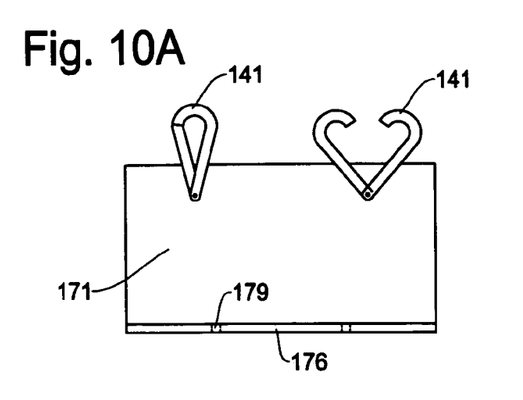
FIGS. 10A and 10B are schematic diagrams showing an example of bracket for mounting the rear seat entertainment device in the second embodiment of the present invention where
Figure 10B:
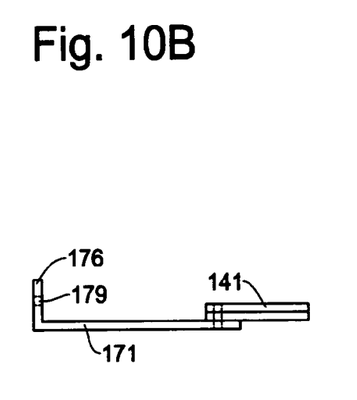

FIGS. 10A and 10B show the second embodiment of the present invention where FIG. 10A is a plan view and FIG. 10B is a side view of the bracket. In this example, the attachment portion of the bracket is configured by clip like members. More specifically, a bracket 171 has clip members 141 that can open to receive the headrest support tubes 91 when opened and grab the support tubes 91 when closed. Thus, when attached, the clip members 141 are sandwiched between the support tube flanges 93 and the top surface of the front seat 87. Similar to the structure of the first embodiment, the bracket 171 has a mounting wall 176 and screw holes 179 for mounting the RSE device 95.

Figure 11A:
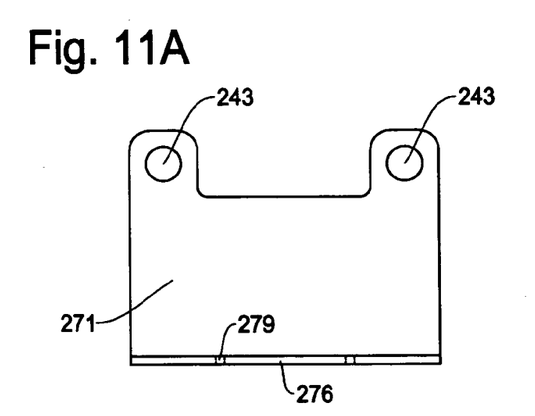
FIGS. 11A and 11B are schematic diagrams showing an example of bracket for mounting the rear seat entertainment device in the third embodiment of the present invention where
Figure 11B:
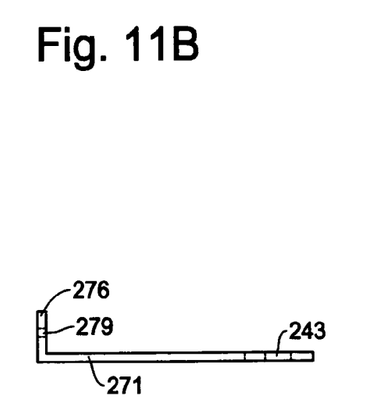

FIGS. 11A and 11B show the third embodiment of the present invention where FIG. 11A is a plan view and FIG. 11B is a side view of the bracket. In this example, the attachment portion of the bracket is configured by attachment holes integrally formed with the bracket. More specifically, a bracket 271 has attachment holes 243 that receive the headrest support tubes 91. The structure of the bracket 271 is useful when the support tubes 91 can be removed from the seat 87 so that the support tubes 91 will be inserted in the attachment holes 243. Thus, when attached on the seat, the areas of the attachment holes 243 are sandwiched between the support tube flanges 93 and the top surface of the front seat 87. Similar to the structure of the first and second embodiments, the bracket 271 has a mounting wall 276 and screw holes 279 for mounting the RSE device 95.

Figure 12A:
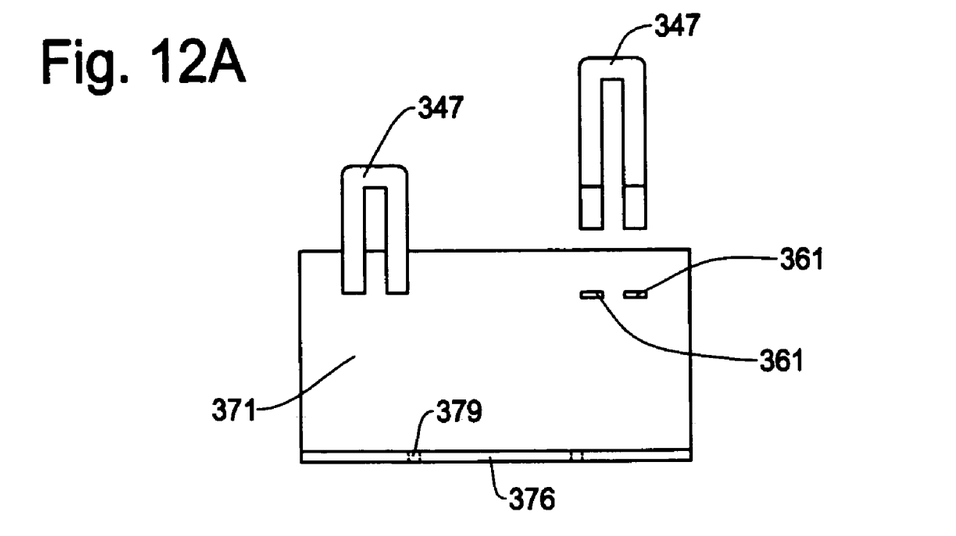
Figure 12B:
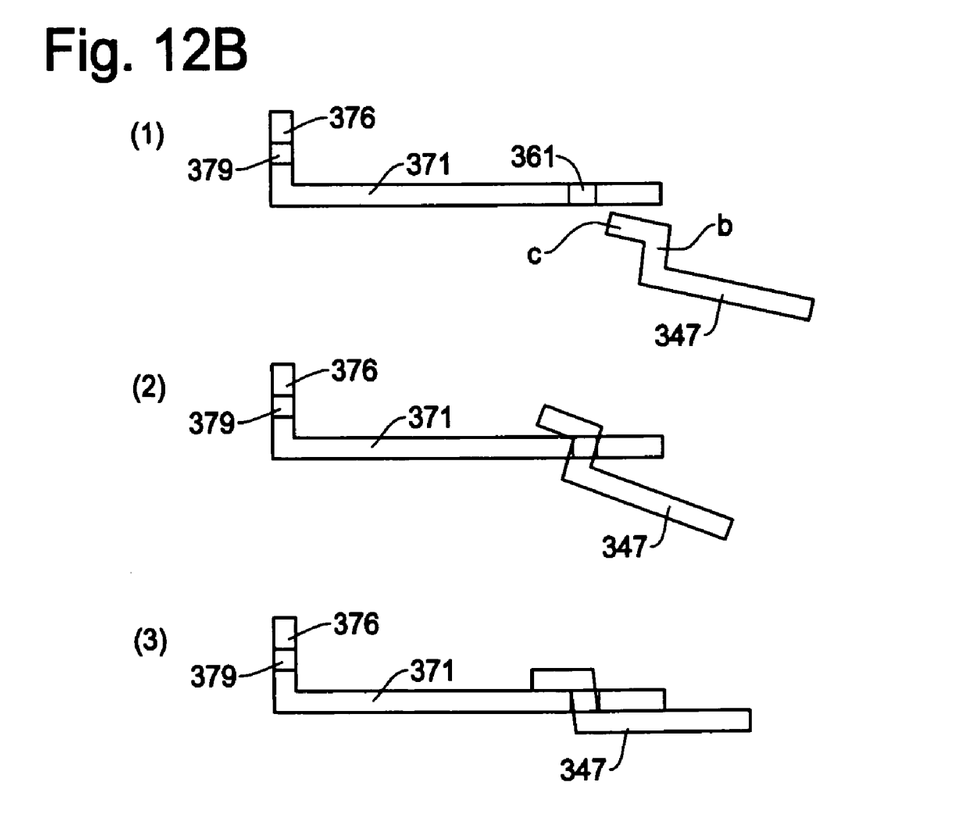

The bracket of the present invention can be constructed by combining separate components. Such a configuration achieves flexibility for mounting the RSE device for various types of vehicle by changing the components. FIGS. 12A and 12B show the fourth embodiment of the present invention incorporating the separate components where FIG. 12A is a plan view and FIG. 12B is a side view of the bracket. In this example, separate hinges are used for the attachment portion of the bracket.

More specifically, a bracket 371 has attachment holes (slits) 361 that receive hinges 347. Preferably, the attachment holes 361 have a size slightly larger than the cross sectional size of the hinges 347. The hinges 347 have a U-shape in plan view for receiving the support tubes 91 and have a step like shape in side view for connection with the bracket 371. The structure of the bracket 371 and hinges 347 is useful to cover a variety of sizes and shapes of the support tubes 91 by changing the hinges. Thus, when being attached on the front seat 87, the areas of the hinges 347 are sandwiched between the support tube flanges 93 and the top surface of the front seat 87. Similar to the structure of the foregoing embodiments, the bracket 371 has a mounting wall 376 and screw holes 379 for mounting the RSE device 95.

The side view of FIG. 12B shows the steps (1) to (3) for connecting the hinges 347 to the bracket 371. By adjusting the angle of insertion, the user can connect the hinges 347 to the bracket 371. The hinge 347 has a step like shape in side view, i.e., it is bent at two points with about 90 degrees at each point. The ends (points c) of the hinge 347 are inserted in the attachment holes (slits) 361 in a direction substantially vertical with the bracket 371. The length of a portion b is almost the same as the thickness of the bracket 371. Thus, when the hinges 347 are straightened on the bracket 371, the hinges 347 are substantially parallel with the bracket 371 and securely attached to the bracket 371.

Figure 13A:
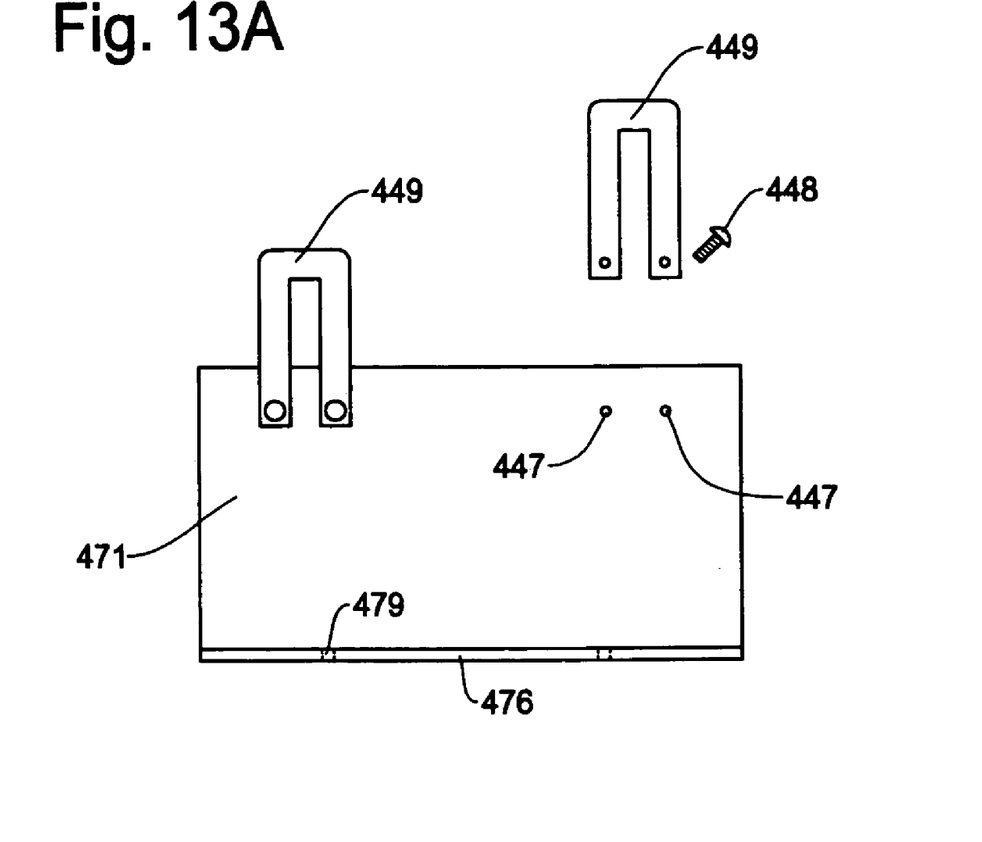
FIGS. 13A and 13B are schematic diagrams showing an example of bracket for mounting the rear seat entertainment device in the fifth embodiment of the present invention where
Figure 13B:
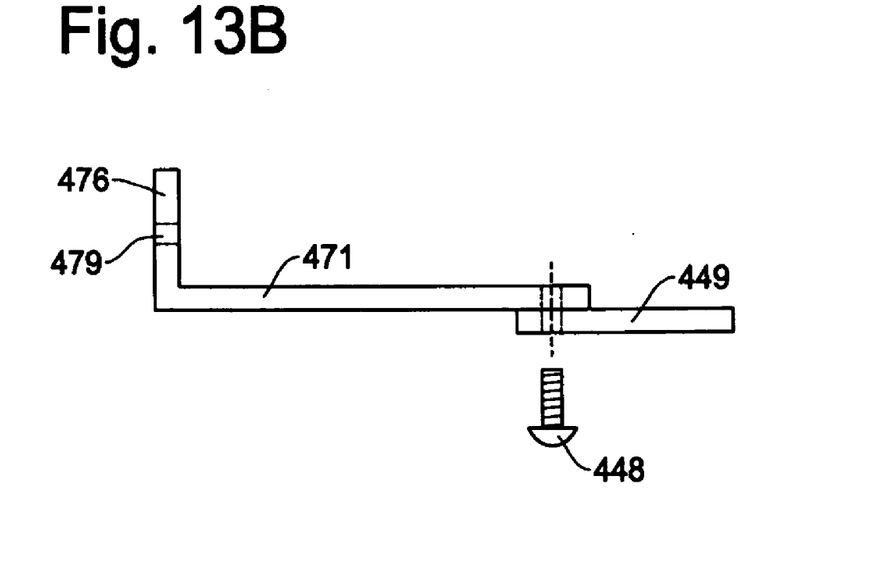

FIGS. 13A and 13B show the fifth embodiment of the present invention where FIG. 13A is a plan view and FIG. 13B is a side view of the bracket. This example is similar to that of FIGS. 12A and 12B by incorporating the separate hinges while the method for connecting the hinges to the bracket is different from one another. Such a configuration achieves flexibility for mounting the RSE device for various types of vehicle by preparing different sizes and shapes of the hinges.

More specifically, a bracket 471 has attachment holes 447 for connecting hinges 449 with use of fastening means such as screws 448. The hinges 449 have a U-shape in plan view for receiving the support tubes 91 and have screw holes corresponding to the attachment holes 447 on the bracket

471. Thus, the hinges 449 are connected to the bracket 471 through the screws 448. The structure of the bracket 471 and the hinges 449 is useful to cover a variety of sizes and shapes of the support tubes 91 by changing the different size and shape of the hinges 449. Thus, when being attached on the front seat 87, the areas of the hinges 449 are sandwiched between the support flanges 93 and the top surface of the front seat 87. Similar to the structure of the foregoing embodiments, the bracket 471 has a mounting wall 476 and screw holes 479 for mounting the RSE device 95.

As has been described above, according to the present invention, the rear seat entertainment device can be mounted on the front seat or middle seat of the vehicle quickly and easily without increasing the cost or adversely affecting the safety of the vehicle. The method and apparatus of the present invention for mounting the rear seat entertainment device eliminates the need of gauging out the back of the seat or the headrest. Moreover, the position of the entertainment device will not be changed as the front seat passenger adjusts the height of the headrest. The method and apparatus of mounting the entertainment device in the present invention allows optimum viewing angle even when the user adjusts the height of the head rest.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A method of mounting a rear seat entertainment device on a front or middle seat of a vehicle, comprising the following steps of:
   preparing a bracket having an attachment portion for attachment with the seat and a mounting wall for attachment with a rear seat entertainment device;
   shifting a headrest upwardly or removing the headrest from the seat to expose a headrest support tube and a flange of the headrest support tube, where the headrest has a support rod at a bottom thereof which is slidably inserted in the headrest support tube;
   placing the attachment portion of the bracket between the flange and a top surface of the seat while pressing down the top surface by the bracket so that an opening of the attachment portion surrounds the headrest support tube without contacting the support rod of the headrest; and
   attaching the rear seat entertainment device to the mounting wall of the bracket and fixedly attaching a lower part of the rear seat entertainment device to the back of the seat;
   wherein the headrest support tube is embedded in the seat where the flange is integrally formed with the headrest support tube at a top portion thereof, and the flange is positioned on the top surface of the seat, thereby clamping the attachment portion of the bracket directly between a bottom surface of the flange and the top surface of the seat by elasticity of the top surface of the seat.

2. A method of mounting a rear seat entertainment device as defined in claim 1, wherein the step of attaching the rear seat entertainment device to the mounting wall of the bracket is conducted before conducting the step of placing the attachment portion of the bracket to top surface of the seat.

3. A method of mounting a rear seat entertainment device as defined in claim 1, wherein the step of attaching the rear seat entertainment device to the mounting wall of the bracket is conducted after conducting the step of placing the attachment portion of the bracket to top surface of the seat.

4. A method of mounting a rear seat entertainment device as defined in claim 1, wherein said step of attaching the rear seat entertainment device to the back of the seat includes a step of connecting the rear seat entertainment device and an inside frame of the seat through an attachment member.

5. A method of mounting a rear seat entertainment device as defined in claim 1, wherein the attachment portion has a J-shaped hook that forms the opening that surrounds the headrest support tube when the attachment portion is attached to the seat between the flange and the top surface of the seat.

6. A method of mounting a rear seat entertainment device as defined in claim 1, wherein the attachment portion has a clip member that opens and closes, where the clip member forms the opening that surrounds the headrest support tube when the attachment portion is attached to the seat between the flange and the top surface of the seat.

7. A method of mounting a rear seat entertainment device as defined in claim 1, wherein the attachment portion has an attachment hole that forms the opening that surrounds the headrest support tube when the attachment portion is attached to the seat between the flange and the top surface of the seat.

8. A method of mounting a rear seat entertainment device as defined in claim 1, wherein the attachment portion is configured by a hinge which is a member separate from the bracket, wherein the hinge has a U-shape in plan view and a step shape in side view and is inserted in a slit of the bracket, and wherein the U-shape of the hinge forms the opening that surrounds the headrest support tube when the attachment portion is attached to the seat between the flange and the top surface of the seat.

9. A method of mounting a rear seat entertainment device as defined in claim 1, wherein the attachment portion is configured by a hinge which is a member separate from the bracket, wherein the hinge has a U-shape that has an attachment hole and is attached to the bracket through a fastener, and wherein the U-shape of the hinge forms the opening that surrounds the headrest support tube when the attachment portion is attached to the seat between the flange and the top surface of the seat.

10. An apparatus for mounting a rear seat entertainment device on a front or middle seat of a vehicle, comprising:
   a bracket having an attachment portion for attachment with the seat and a mounting wall for attachment with a rear seat entertainment device;
   a headrest which is shifted upwardly or removing the headrest from the seat to expose a headrest support tube and a flange of the headrest support tube, where the headrest has a support rod at a bottom thereof which is slidably inserted in the headrest support tube; and
   means for placing the attachment portion of the bracket between the flange and a top surface of the seat while pressing down the top surface by the bracket so that an opening of the attachment portion surrounds the headrest support tube without contacting the support rod of the headrest; and
   wherein the rear seat entertainment device is attached to the mounting wall of the bracket and a lower part of the rear seat entertainment device is fixedly attached to the back of the seat; and
   wherein the headrest support tube is embedded in the seat where the flange is integrally formed with the headrest support tube at a top portion thereof, and the flange is positioned on the top surface of the seat, thereby elastically clamping the attachment portion of the bracket directly between a bottom surface of the flange and the top surface of the seat by elasticity of the top surface of the seat.

11. An apparatus for mounting a rear seat entertainment device as defined in claim 10, wherein the rear seat entertainment device is attached to the mounting wall of the bracket before placing the attachment portion of the bracket to top surface of the seat.

12. An apparatus for mounting a rear seat entertainment device as defined in claim 10, wherein the rear seat entertainment device is attached to the mounting wall of the bracket after placing the attachment portion of the bracket to top surface of the seat.

13. An apparatus for mounting a rear seat entertainment device as defined in claim 10, further comprising means for connecting the rear seat entertainment device and an inside frame of the seat through an attachment member.

14. An apparatus for mounting a rear seat entertainment device as defined in claim 10, wherein the attachment portion has a J-shaped hook that forms the opening that surrounds the headrest support tube when the attachment portion is attached to the seat between the flange and the top surface of the seat.

15. An apparatus for mounting a rear seat entertainment device as defined in claim 10, wherein the attachment portion has a clip member that opens and closes, where the clip member forms the opening that surrounds the headrest support tube when the attachment portion is attached to the seat between the flange and the top surface of the seat.

16. An apparatus for mounting a rear seat entertainment device as defined in claim 10, wherein the attachment portion has an attachment hole that forms the opening that surrounds the headrest support tube when the attachment portion is attached to the seat between the flange and the top surface of the seat.

17. An apparatus for mounting a rear seat entertainment device as defined in claim 10, wherein the attachment portion is configured by a hinge, wherein the hinge has a U-shape in plan view and a step shape in side view and is inserted in a slit of the bracket, and wherein the U-shape of the hinge forms the opening that surrounds the headrest support tube when the attachment portion is attached to the seat between the flange and the top surface of the seat.

18. An apparatus for mounting a rear seat entertainment device as defined in claim 10, wherein the attachment portion is configured by a hinge, wherein the hinge has a U-shape that has an attachment hole and is attached to the bracket through a fastener, and wherein the U-shape of the hinge forms the opening that surrounds the headrest support tube when the attachment portion is attached to the seat between the flange and the top surface of the seat.

* * * * *